US012605296B2

(12) United States Patent
Jackson, Jr. et al.

(10) Patent No.: US 12,605,296 B2
(45) Date of Patent: Apr. 21, 2026

(54) LIFE CART

(71) Applicants: Larry Cornelius Jackson, Jr., Warner Robins, GA (US); Morris Bernard Clarington, Perry, GA (US)

(72) Inventors: Larry Cornelius Jackson, Jr., Warner Robins, GA (US); Morris Bernard Clarington, Perry, GA (US)

( * ) Notice: Subject to any disclaimer, the term of this patent is extended or adjusted under 35 U.S.C. 154(b) by 797 days.

(21) Appl. No.: 18/051,094

(22) Filed: Oct. 31, 2022

(65) Prior Publication Data

US 2024/0139052 A1 May 2, 2024

(51) Int. Cl.
*A61G 7/10* (2006.01)
*A61G 13/10* (2006.01)

(52) U.S. Cl.
CPC ......... *A61G 7/1048* (2013.01); *A61G 7/1034* (2013.01); *A61G 7/1073* (2013.01); *A61G 13/104* (2013.01); *A61G 2203/20* (2013.01); *A61G 2203/44* (2013.01)

(58) Field of Classification Search
CPC ... A61G 10/005; A61G 7/1048; A61G 7/1073
See application file for complete search history.

(56) References Cited

U.S. PATENT DOCUMENTS 3,112,001 A * 11/1963 Wise ........................ A61G 7/16 180/343
3,137,869 A * 6/1964 Johnson ................. A61G 5/128 180/211
3,452,371 A * 7/1969 Hirsch ................. A61G 7/1067 5/89.1
3,663,972 A * 5/1972 Denton .................... A61G 1/00 5/628
10,314,754 B2 * 6/2019 Karwal .................. A61G 7/008
11,214,290 B1 * 1/2022 Elvey-Toombs ...... B62B 3/1484
(Continued)

FOREIGN PATENT DOCUMENTS

CN 111956402 A * 11/2020 ............... A61G 7/00

*Primary Examiner* — Valentin Neacsu
*Assistant Examiner* — Hosam Shabara
(74) *Attorney, Agent, or Firm* — Lambert Shortell & Connaughton; David J. Connaughton, Jr.; Justin P. Tinger

(57) ABSTRACT

Powered patient transport/support apparatuses—such as medical beds, gurneys, and surgical tables, that include various modifications to existing equipment which provide the caregiver a more efficient way to provide transport care to the patient. Telescoping arm systems, counterweight stability units, and zero-turn chassis give the caregiver the ability to move a patient without any additional assistance, thus reducing potential injury and secondary errors. Touch-screen monitors coupled with other vital sign monitoring equipment give the caregiver real in-time assessment of patient's condition while in transit. Rechargeable batteries are charged and stored on the docking station for easy access. Sensors detect proper weight distribution and adjust to provide stability to the patient when being moved from one place to another. Drone capabilities are available for the military version to actively search out wounded soldiers in the field without having to put more soldiers on the ground. Autoclave drawers are used for sanitation purposes on the Surgical Center to ensure all equipment gets properly cleaned before, during, and after an invasive procedure.

10 Claims, 13 Drawing Sheets

(56) References Cited

U.S. PATENT DOCUMENTS

| | | | | |
|---|---|---|---|---|
| 2007/0067905 | A1 * | 3/2007 | Wilder | A61G 7/1011 5/83.1 |
| 2023/0181399 | A1 * | 6/2023 | De Man | A61G 10/02 600/21 |

* cited by examiner

LIFE CART

BACKGROUND

The present invention relates to the need for correcting patient transportation inadequacies that have continuously become a systemic issue in the health field. With the lack of quality patient care stemming from the constant effects of inadequate staffing issues, hospitals are heavily burdened with patient transportation problems. It has become evident that a change in the method of practice is warranted and that it must be consistent with the ever-changing technological advancements throughout the medical industry.

The concept of the Life Cart was designed by Larry Cornelius Jackson Jr., who worked in the medical field and fire department services for twelve years. Through his years of experience in the field he ascertained the need for change in patient transportation. Immobile patients that rely on medical staff require extra personnel who must pay close attention to detail as they safely transport patients from place to place. Through these seemingly simple interactions many of the nosocomial or secondary infections take place and ultimately drive customer satisfaction down.

Mr. Jackson's company, EFix-Way, has developed an innovative design that will enhance the utility aspect of existing products as well as improve all procedural methods that encompass medical patient transportation. There have been attempts made to take the strain of patient transportation away from medical staff (i.e.: portable lifts, transfer chairs, etc.); however, these devices have not proven to be effective considering that there are over 200,000 work-related injuries a year according to the Department of Labor. Take into consideration the growing population of immobile patients accompanied with a shrinking medical staff, and it shows that there is a need to address the obvious.

BRIEF SUMMARY OF THE INVENTION

The Life Cart is designed to be operated by only one staff member. The zero-turn like capabilities of the device gives it a turning radius suitable for tight or crowded spaces, making it easier to enter any patient room setting. Intuitive steering will assist with a more stable control of movement through space, preventing the usual drifting effect seen on many modern medical beds as they are being guided. A stable standing platform for the driver will ensure that the driver can safely maneuver the patient without ever having to be subjected to accidental errors caused by the combined weight of the patient and the cart, itself.

The most attractive feature related to patient transportation is the lightweight, durable forklift system that consists of telescoping arms that can be used in addition with the body board to safely lift and lower patients to and from the bed or surgical table. This new process eliminates the possibility of patient falls and medical staff injuries. In addition, the cart provides a particulate barrier between the transporter and the patient, that serves as a shield to further reduce the microbial transfer of infectious disease. Included are various monitoring devices (i.e., EKG, Defibrillator, Thermometer, Pulse Sensor, and Blood Pressure Cuff) to help expedite any emergency actions taken due to sudden change in the patient condition.

Efix-Way also reserves the fact that two additional versions: the Retriever (Military version), and the Surgical Center model will serve in a more specialized role. These two versions will consist of the same lightweight material as the Life Cart with various modifications designed to address needs in the field.

The Retriever with its low stable center of gravity and off-road capabilities, will be used to retrieve fallen soldiers during battle. Drone like technology will permit it to be guided without having to be present in the field. High tech armor protection will keep the soldier safe during extraction.

The Surgical Center model gives surgeons a more specialized option to suit their surgical preferences and needs during medical procedures. The main attractive feature of the Surgical table, is that each drawer or tool compartment serves as its own autoclave, eliminating the need for the additional surgical trays or tables.

A: EKG: Used to monitor changing heart condition

B: Defibrillator: ALS/BLS. Life sustaining equipment used for reviving patients.

C: Blood Pressure Monitor: Checks blood pressure

D: Thermometer: Checks patient's temperature

E: Pulse Sensor: Monitors patients' pulse

Figure 10:
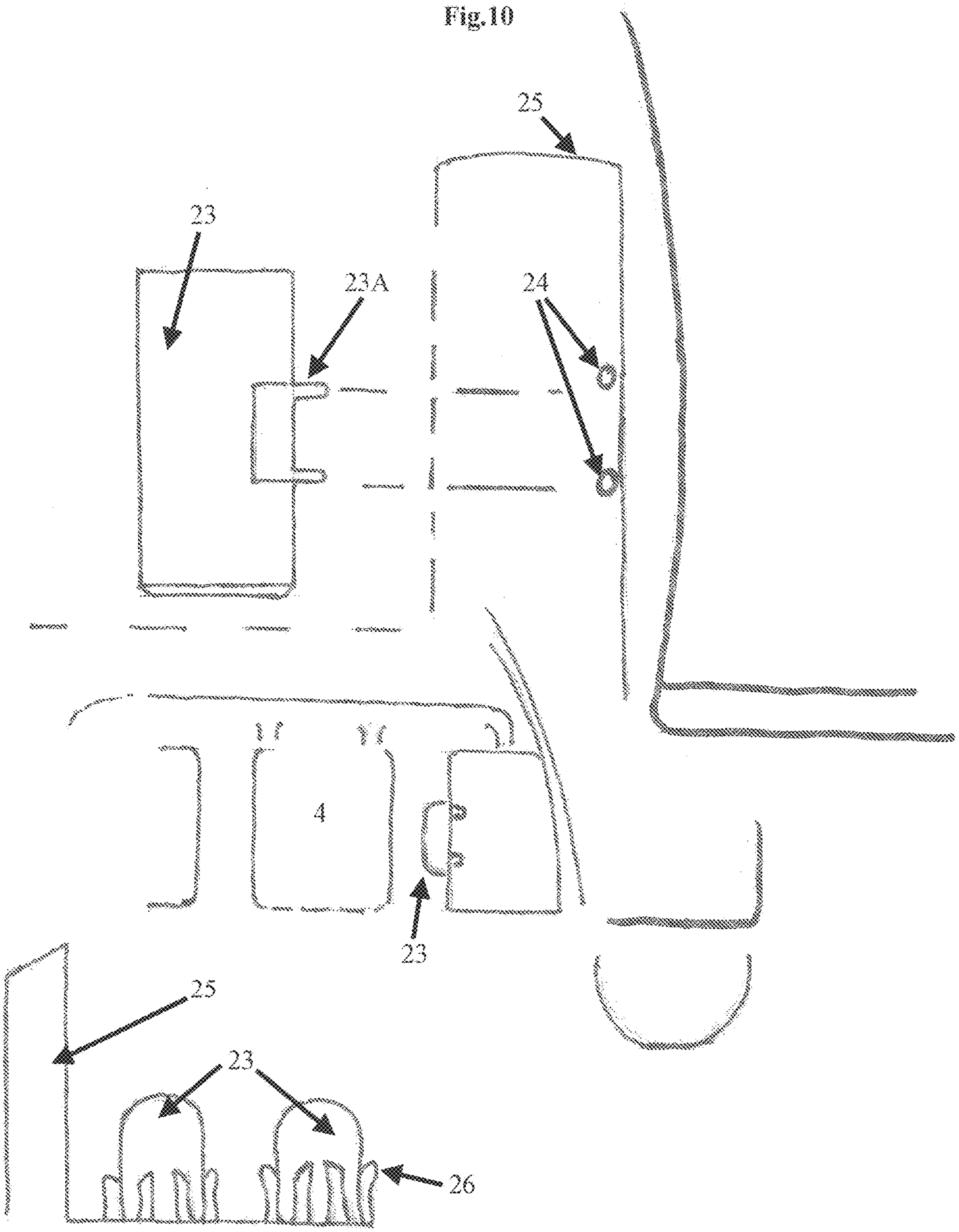

FIG. 10. E-Compact Charging Station: Small compact charging station with accelerated charging capabilities. Wil create maximum charge in shorter time. Energy conservation concepts for this design will make the Life Cart a more efficient form of patient transportation and overall care.

Figure 11:
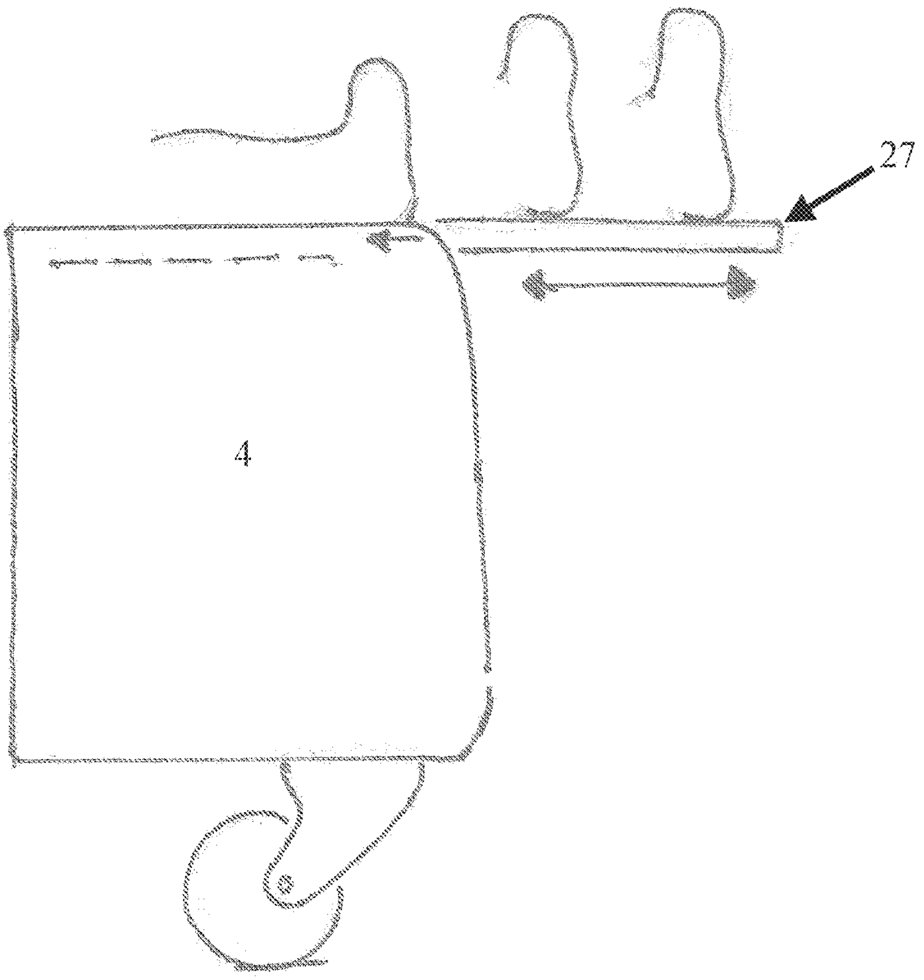

FIG. 11. E-Extender: Extending board to the body of Life Cart which allows the cart to accommodate taller patients. Can be pulled out at the foot of the cart to provide added support when needed.

Figure 12:
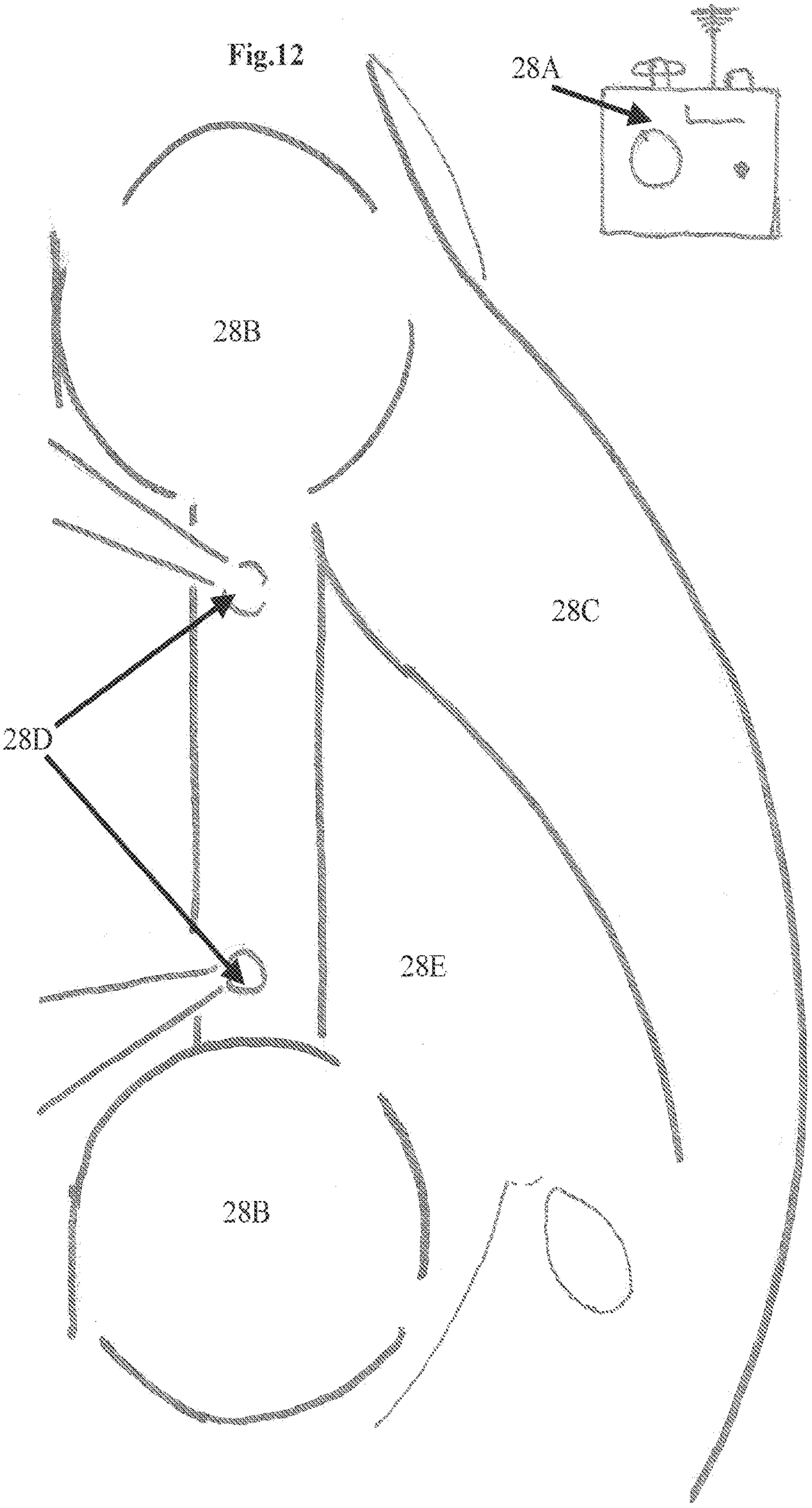

FIG. 12. E-Retriever: Overview of design layout. This is an extension or modification reserved for future implementation. Key components will include, but not limited to:

A: Remote steering/Drone capabilities with GPS Tracking.

B: All terrain tires to navigate field conditions.

C: Bullet proof body shield used to protect soldier during extraction.

D: E-Arm system used to rescue soldier in the field.

E: Resting platform for soldier

Figure 13:
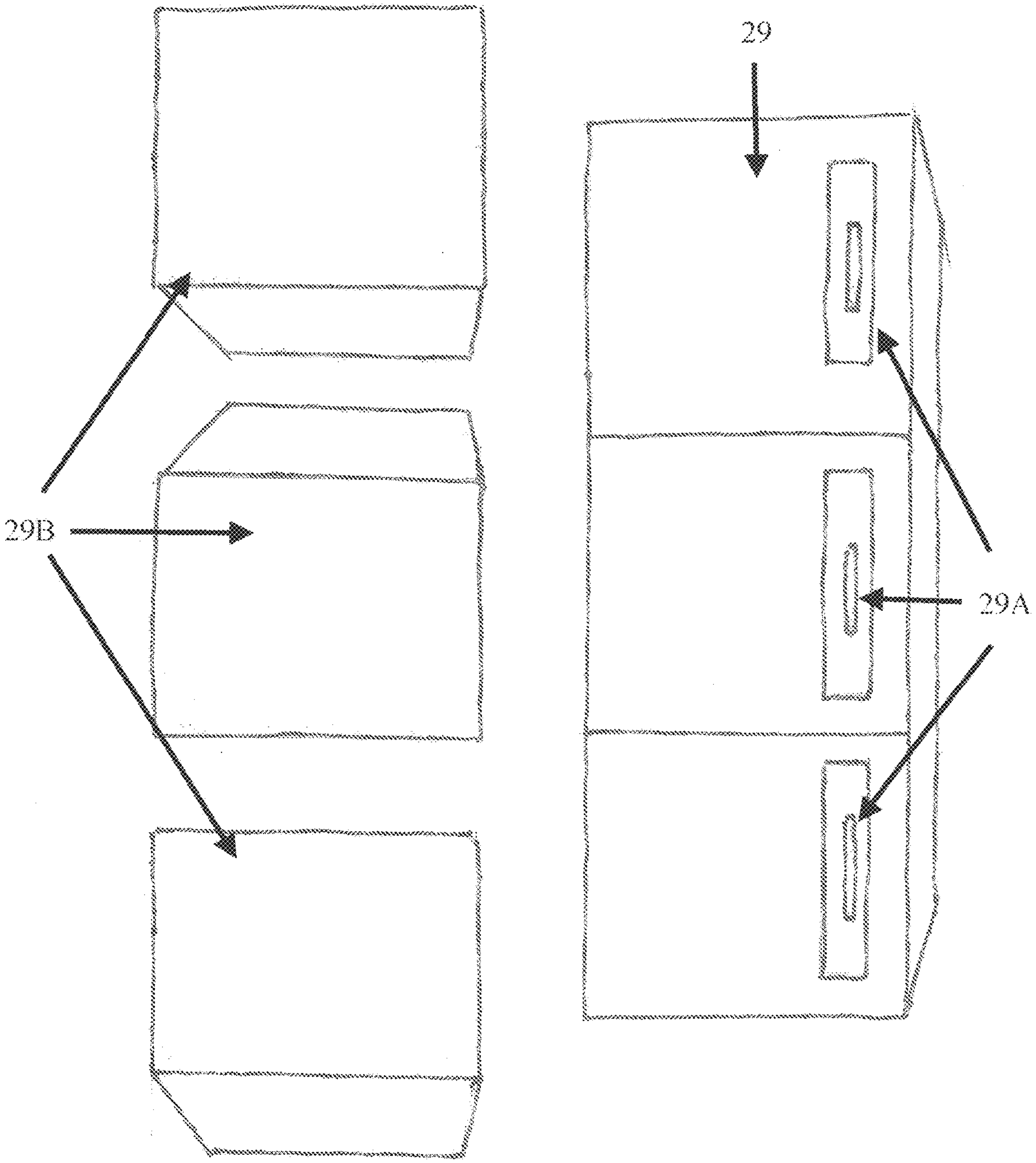

FIG. 13. E-Surgical Center: Overview of design layout. This is an extension or modification reserved for future implementation. Key components will include, but not limited to:

A: Autoclave drawer/surgical tool compartment

B: Detachable Tier Table designed for easy breakdown and reassembly

DETAILED DESCRIPTION AND BEST MODE OF IMPLEMENTATION

Once a request is made for the transportation of a patient, the Nurse/Life Cart Operator will unplug FIG. 10 [E-Compact Charging Cord] from the power source 25 and its charging brace 26. Easy touch assist 16D allows the operator to easily start the Life Cart by pressing the start button 16D. The body 4 of the Life Cart comes with three rechargeable batteries 23. When attached to the body 4, in power slots 24, rechargeable battery 23 can last for up to 10 hours of use before additional charge is needed or changed.

Figure 5:
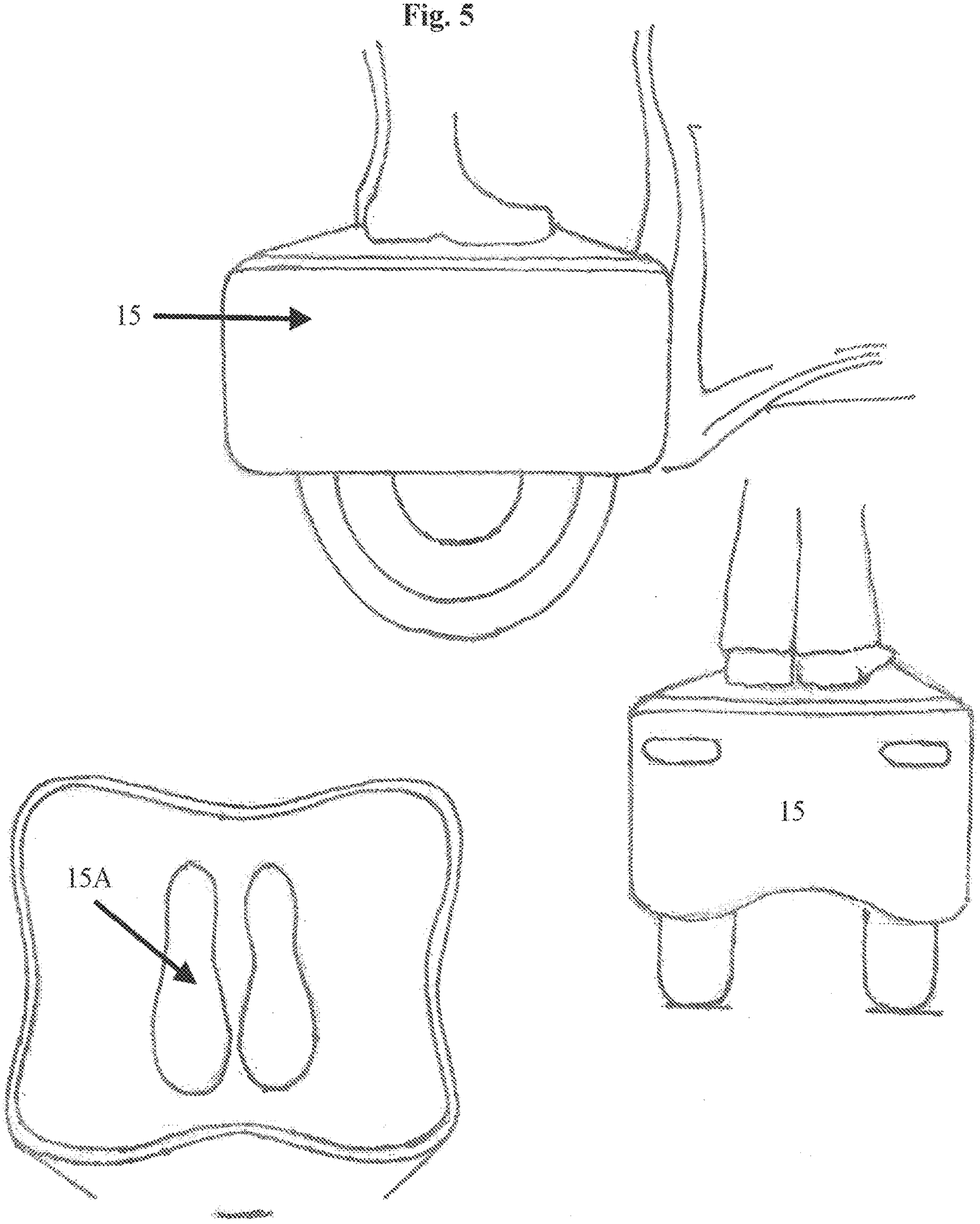
FIG. 5. E-Platform: Standing platform for transporter. High grip/nonslip matting ensures safe traction for maximum footing.

Standing firmly on FIG. 5. [E-Platform] 15, which rests above the rear wheels 2, the Nurse/Operator can position his/her feet in position 15A and safely respond to the call for bedside assistance or removal.

Figure 4:
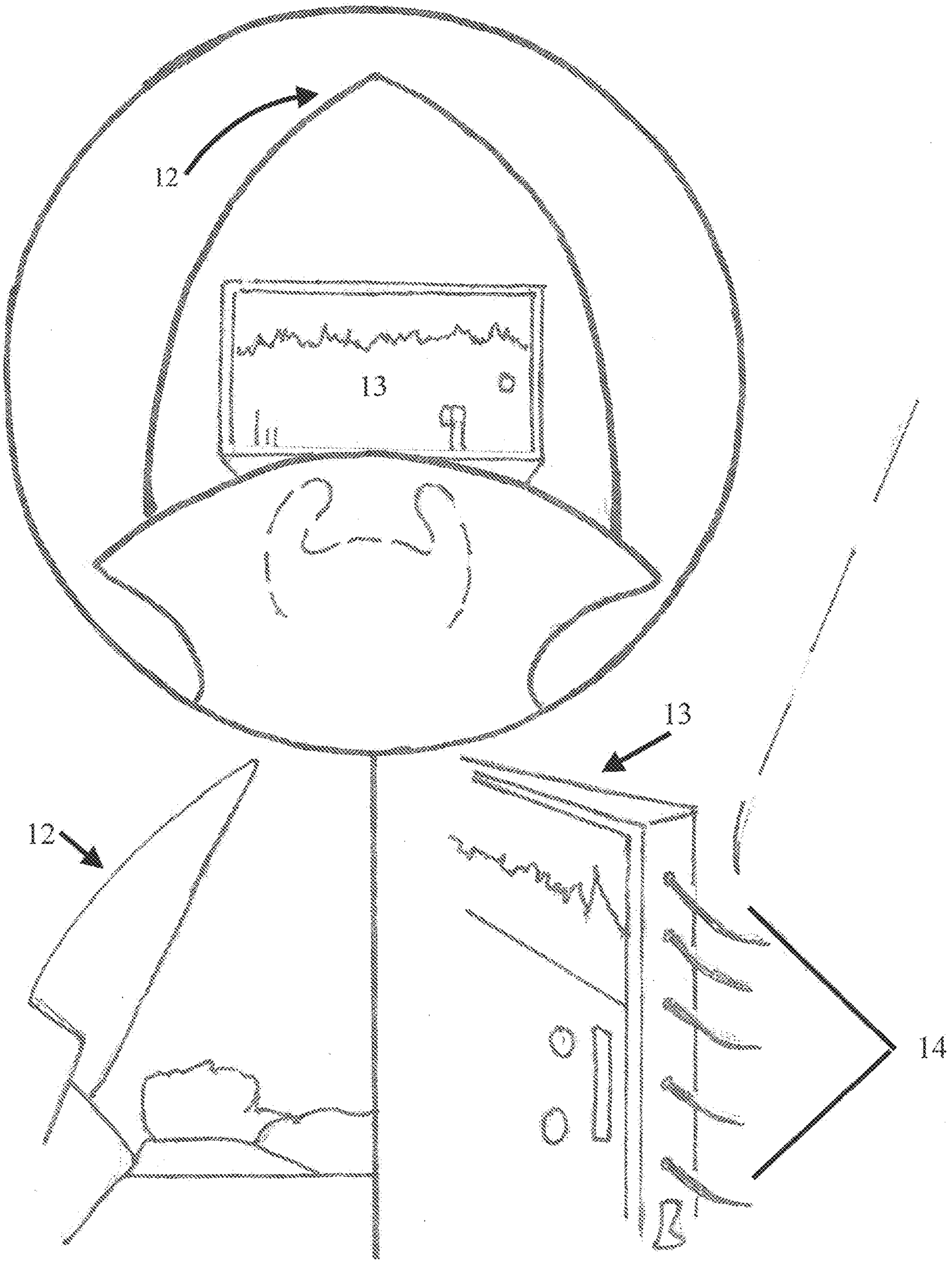
FIG. 4. E-Guard and E-Finity Board: Clear polycarbonate material provides maximum microbial barrier/shield between patient and transporter. Ability for visual observation and monitoring while in transit. E-Finity board ties in all related equipment necessary to keep a track on patient's vitals.
Figure 9:
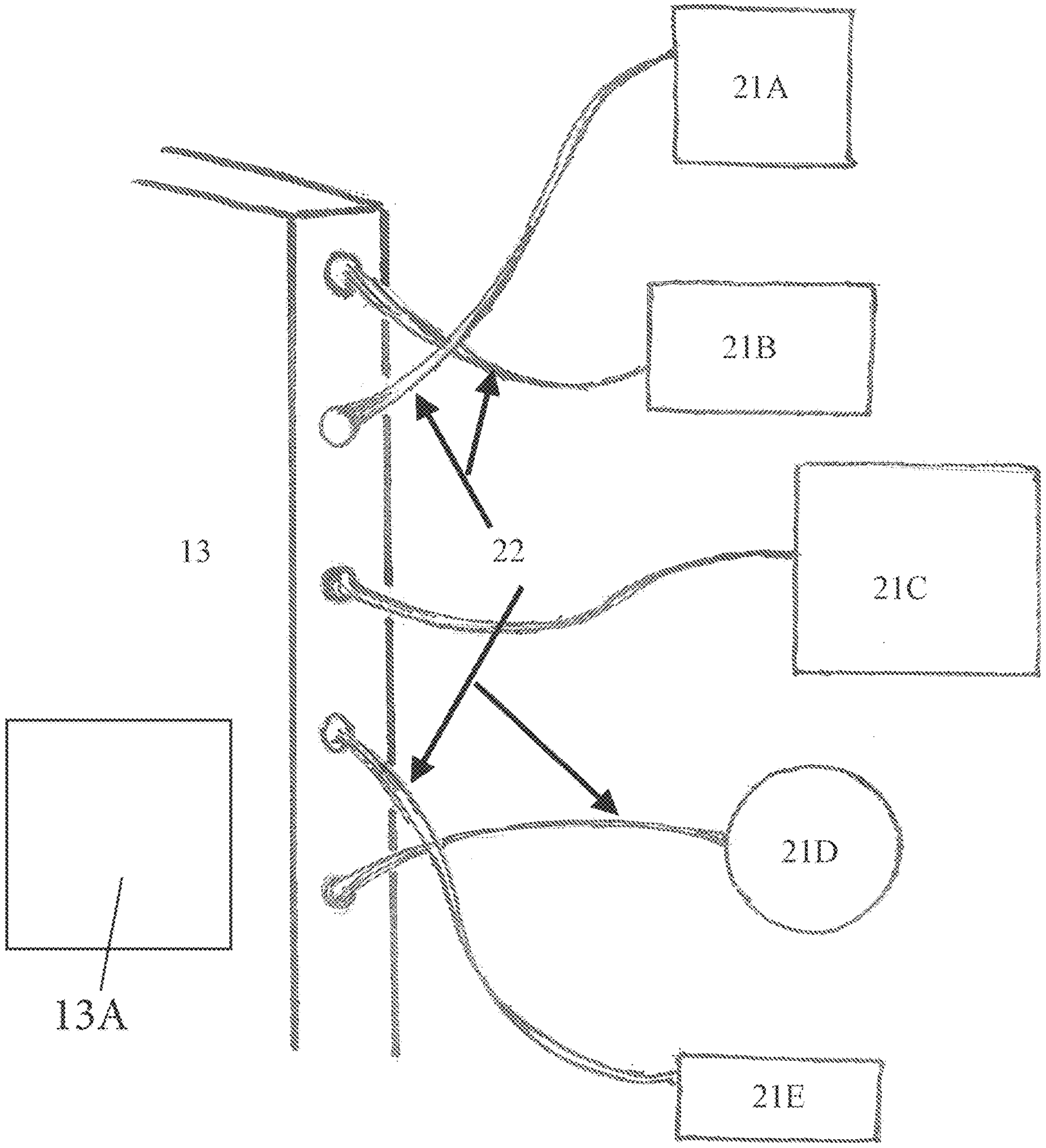
FIG. 9 (A-F). E-Monitoring Bundle Pack.

Connected to the E-Guard 12, which protects the patient from airborne pathogens, located in FIG. 4; the nurse/operator will find all monitor and power controls located on the E-Finity Board 13. Power outlet sources 14 are located on the side of the E-Finity Board 13 for easy connection to the Monitoring Bundle Pack in FIG. 9. Touchscreen simplifies monitoring processes as the Nurse/Operator transports the patient.

Figure 6:
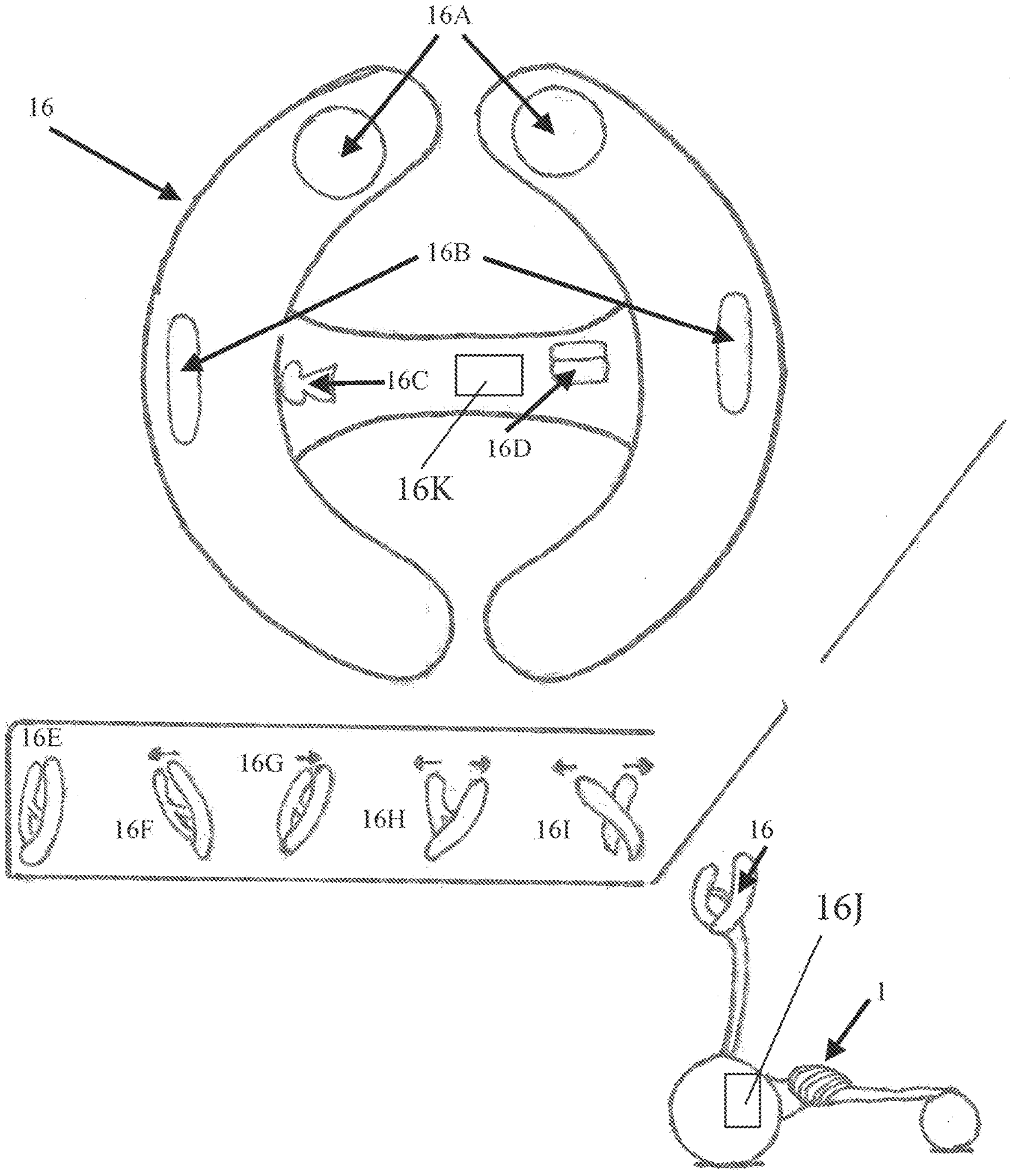
FIG. 6. E-Steering/E-Traffic Horn: Power/Assistant steering equipped with directional control nobs for zero-turn utilization. Creates ease of control and stability while performing steering maneuvers. Traffic Horn alerts others that patient is in transit.

The Nurse/Operator can easily navigate the Life Cart by utilizing the power-steering wheel assistant in FIG. 6. [E-Steering] which connects to the steering column that controls the chassis system 1. The assist takes away the unsteady motion of steering and gives a more stable, smooth experience. On the steering wheel 16 the buttons located at 16A provide the power for going forward or reverse. The Life Cart body 4 will not move if these buttons are not pressed. These buttons can also control the wheels 2 independently of each other 3 by only pressing one at a time. If the right button 16A is only pressed the right rear wheel will be the only wheel that will move in the desired direction while the left button 16A serves as a break and pivot point for tighter turns, locking the left rear wheel in place. The buttons labeled 16B are for extending and retracting the E-Arms 6 to the right or left side of the Life Cart body 4. When 16B right is pressed the E-Arms 6 will extend and retract to the right side of the Life Cart body 4. When 16B left is pressed the E-Arms 6 will extend and retract to the left side of the Life Cart body 4. Button 16C operates the E-Horn, and button 16D controls the E-LED safety lighting system in FIG. 8. Steering wheel position 16E shows the wheel position when the Life Cart is in neutral or stationary position. Position 16F shows the steering wheel position when traveling in reverse. Position 16G shows how the steering wheel is pushed forward on both sides to make the Life Cart go forward. Position 16H shows the left side of the steering wheel being pulled back toward the operator and the right side being pushed forward simultaneously. This position will turn the Life Cart to the left in a tight position. Position 16I is the opposite of 16H. The right side is pulled back toward the operator while the left is pushed slightly forward to achieve a tight right turn. The steering column of 16 runs down to connect with the chassis system 1 to provide maximum steering control.

Figure 1:
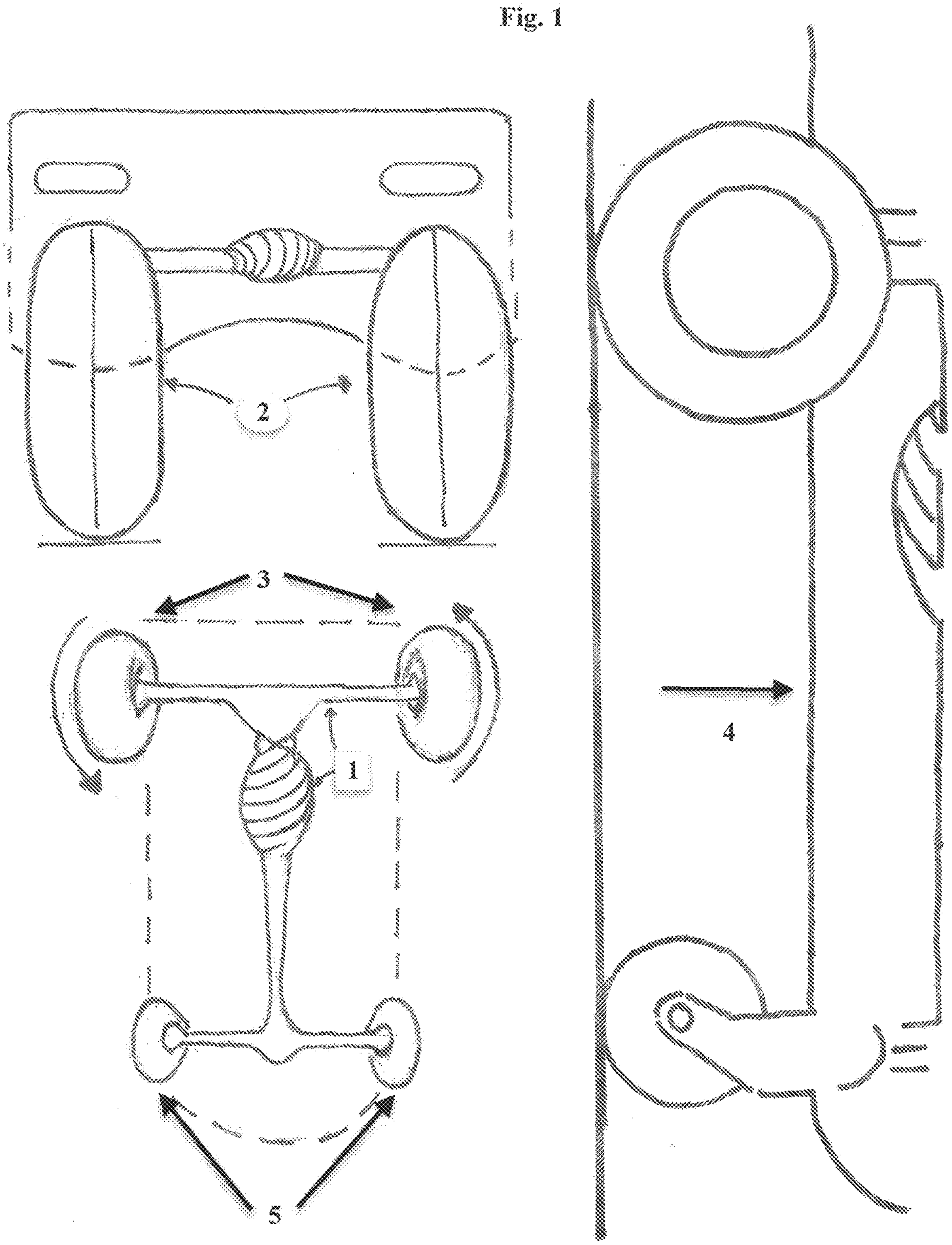
FIG. 1. Zero E-Turn Chassis: Life Cart feature that performs like that of a Zero-Turn mower. The front wheels attach to the body of the frame. The rear wheels can operate in directions independently of each other or in unison, providing the operator with a wide sense of control and turning radius suitable for smaller or congested areas.

As the Life Cart is guided into the tight living quarters of the patient, the Zero E-Turn Chassis in [FIG. 1] is activated giving the Operator a turning radius that will allow the Life Cart to pull within proximity of the stationary bed. The rear wheels 2 can be operated independently 3 of each other through the chassis system. The front wheels 5 have no directional control. They move on a swivel rotating axis that allows the front wheels to be guided by the rear wheels 2.

Figure 2:
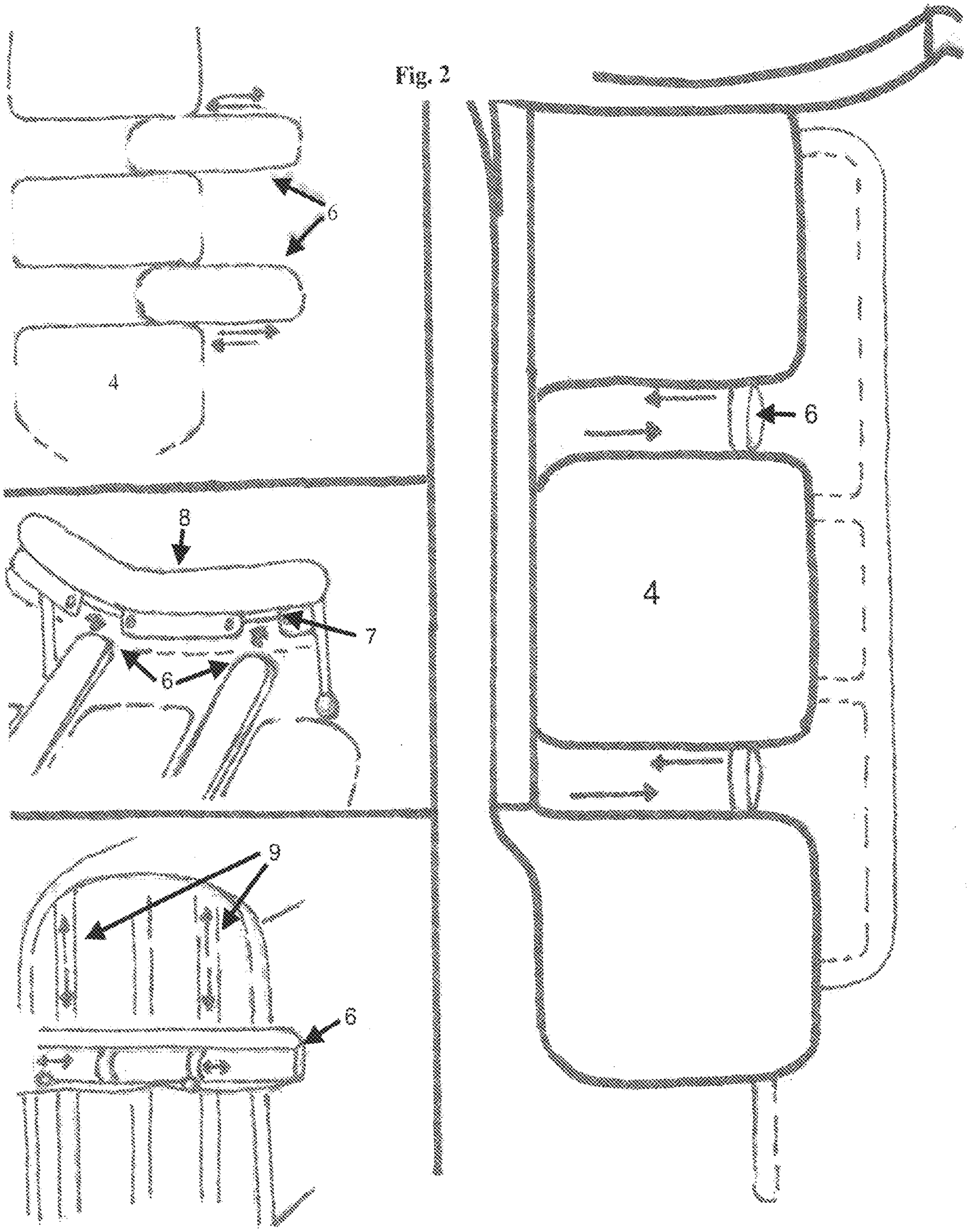
FIG. 2. E-Arm System: Telescoping arms made of a lightweight corrosion resistant magnesium alloy, provide the strong lifting mechanism necessary to move patients to and from stationary beds.
Figure 7:
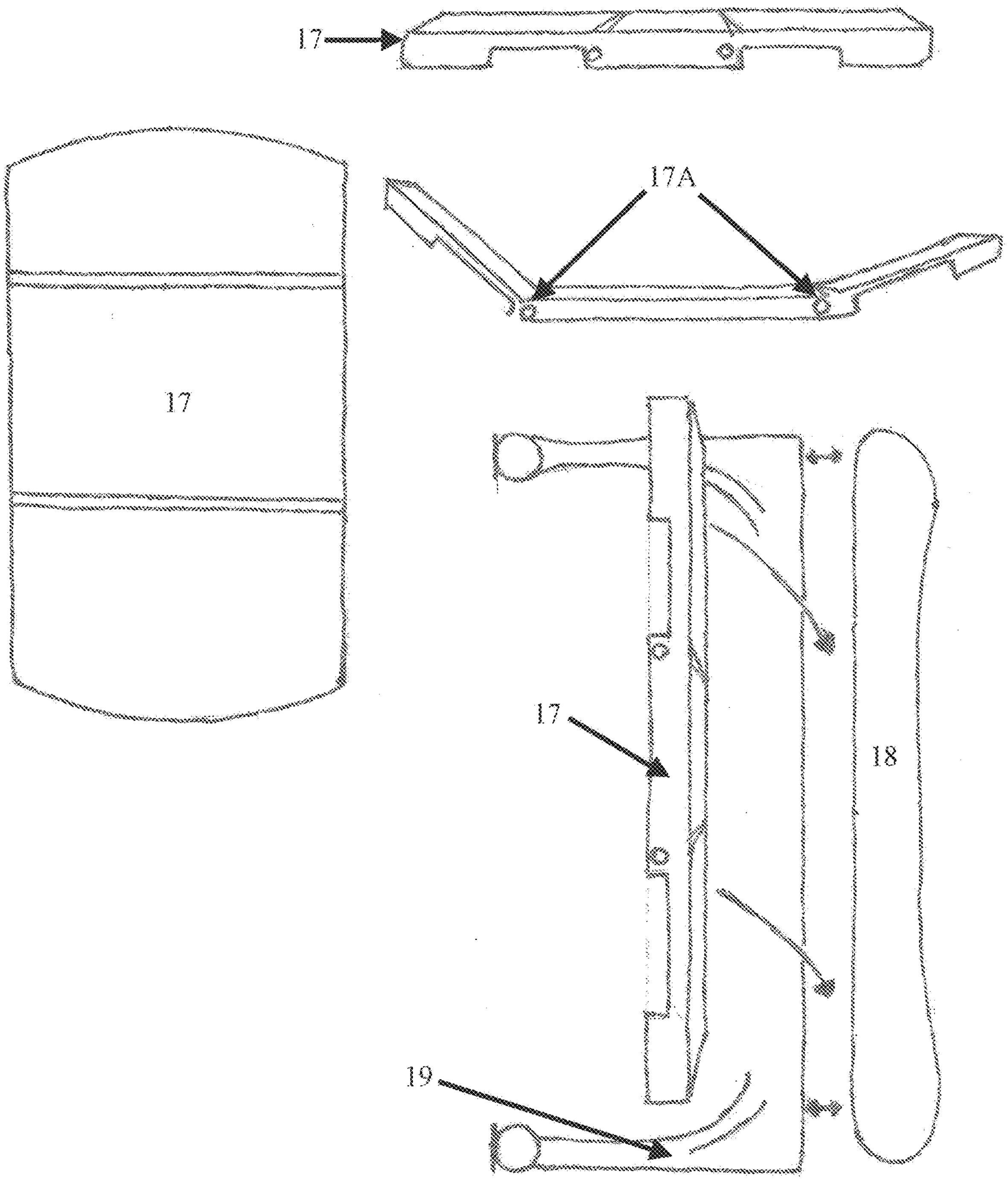
FIG. 7. E-Board: Thin polycarbonate articulating bed board able to be inserted under existing medical mattress. Gives unrestricted access to E-Arm system for lifting purposes.

The E-Arm System, 6 in [FIG. 2] moves up and down the inner track hull 9 of the body 4 and can be activated by the operator with directional buttons 16B seen on E-Steering wheel 16. As the arms telescope outward towards the patient's bed, they will find the E-Board 17 in [FIG. 7], either already placed under the existing mattress 18 or placed upon Doctor's request for high quality transportation. Once the E-Arms 6 are fully inserted into the E-Board 17 (located under the mattress 18), and securely underneath the patient, the steady E-Arms 6 will slowly lift patient from the frame of the stationary bed to bring the patient closer to the Life Cart body 4.

Figure 3:
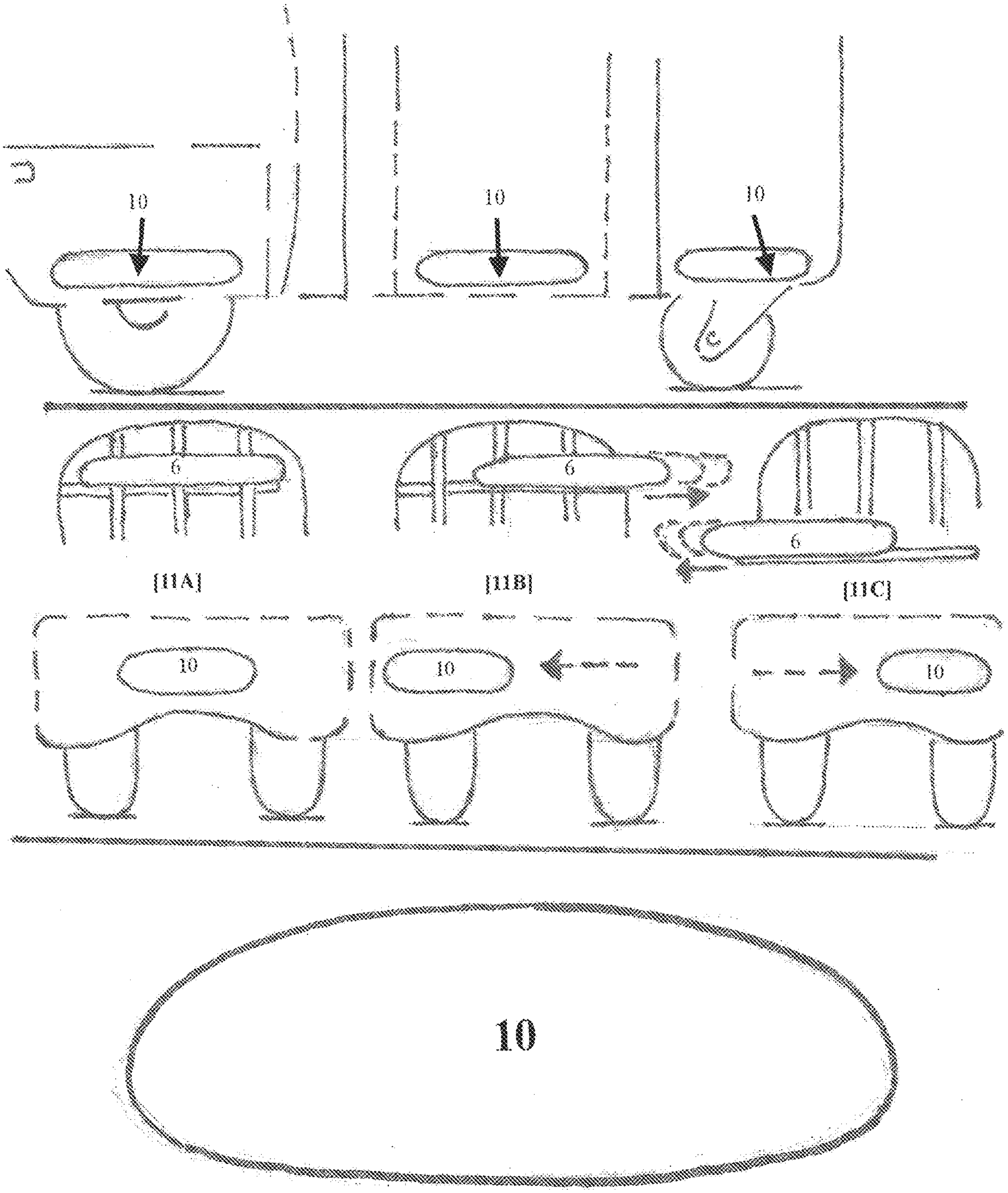
FIG. 3. E-Cantilever/Counterweight Stability Unit: Designed for added stability when E-Arm system is in extended mode when lifting patient. Smoother consistent steering performance during traveling motions.

When the E-Arm system has the patient away from the Life Cart body 4 in extended mode, the E-Cantilever/Counterweight Stability Unit 10 in [FIG. 3], which is made of a durable 8001*b* capacity aluminum alloy metal, will engage to provide maximum stability to control weight distribution to prevent tipping of the patient. Position 11A shows the E-Cantilever/Counterweight Stability Unit 10 in the neutral position. Position 11*b* shows the E-Cantilever/Counterweight Stability Unit 10 shifting to the left of the Life Cart body 4 base as the E-Arms 6 extend outward to the right. Position 11C shows E-Cantilever/Counterweight Stability Unit 10 shifting to the right of the Life Cart body 4 base as the E-Arms 6 extend outward to the left.

Based on the patient's length the E-Extender 27 in FIG. 11 can be pulled out to accommodate a taller patient. Once the patient has been securely placed on the Life Cart, the Nurse/Operator can proceed to attach monitoring devices to the patient using FIG. 9 (21A-21F), the E-Monitoring Bundle Pack which is connected to the E-Finity Board 13 through power connectors 14 and power cords 22. 21A is the EKG machine used to monitor the heart. 21B contains a defibrillator used to revive patients in emergency situations. 21C contains a blood pressure cuff used to measure patient's blood pressure. 21D contains a thermometer to check the patient's temperature. And 21E contains a pulse monitor to monitor the patient's pulse. Any significant changes to patients' condition will notify the Operator on the E-Finity Board 13 in [FIG. 4].

Figure 8:
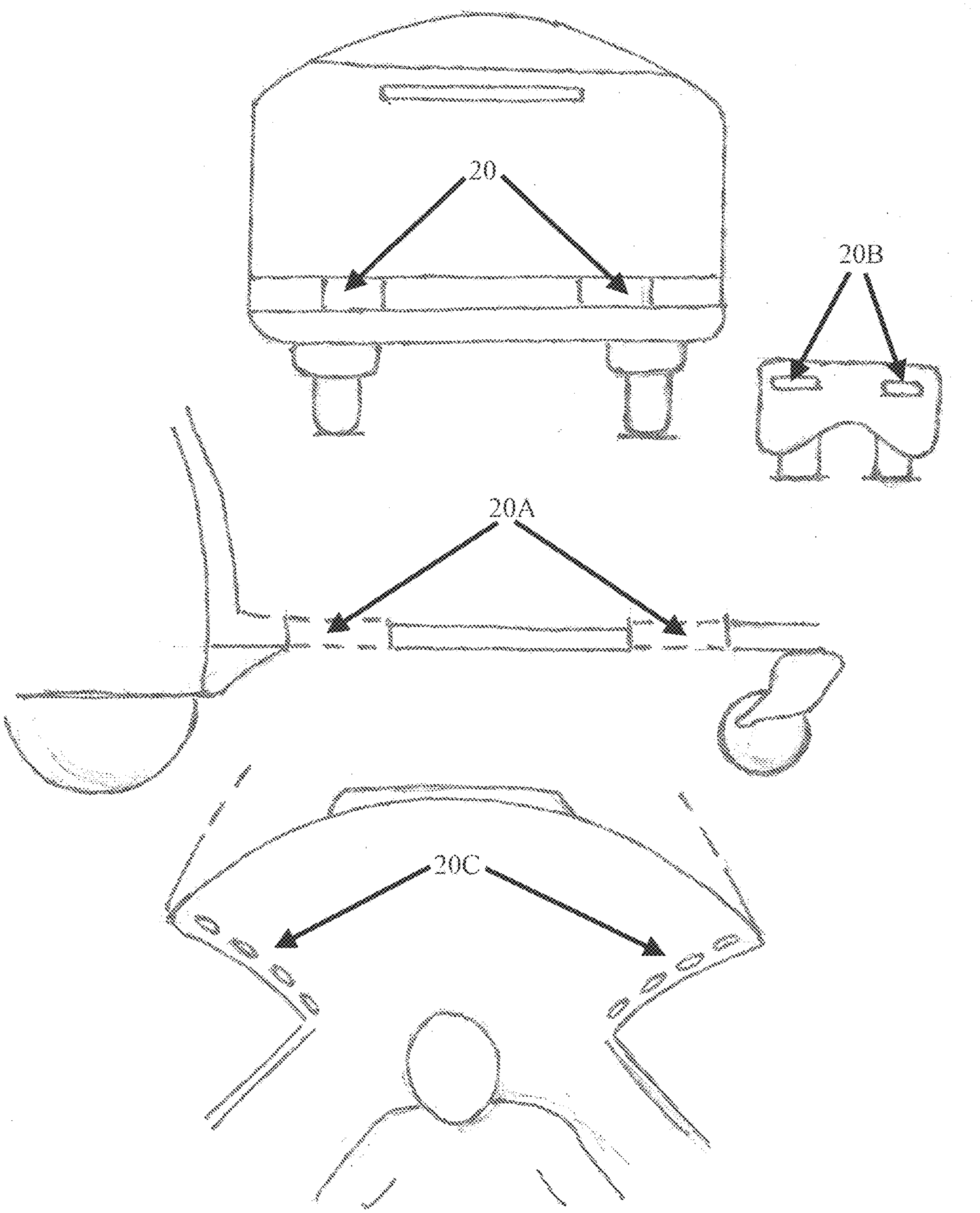
FIG. 8. E-LED Safety Lighting: Equipped with safety lighting based on safety protocol to ensure safe transportation of patients while in the medical setting.

While in transit, the operator will follow standard safety protocol by utilizing FIG. 8, the E-LED Safety Lighting. The lighting covers the front 20 of the body 4, the standing E-Platform 15 rear lights 20B, the side bar lights 20A of the body 4, and the E-Finity Board 13 base backboard lighting.

This will visually notify whoever may find themselves in harm's way that the patient is in transit.

The patient is taken to his/her desired location and lowered to the operating table or bed using the same methods used in previous procedures.

In FIG. 12, a Life Cart modification 28 can be used in a military setting like that in a hospital. Using the remote 28A the E-Retriever becomes a drone that can be guided to the wounded soldier. The all-terrain wheels 28B give the E-Retriever maneuverability and stability in hot zones. The bullet proof body shield 28C protects the soldier from enemy fire as the soldier is being extracted from the battlefield. The E-Retriever E-Arm system is located at 28D. These arms pull soldier from the field and place the soldier on the resting platform 28E to be guided away from the battlefield.

In FIG. 13, a Life Cart modification, E-Surgical Center, 29 can be fitted to the specific needs of each surgeon. The main component of the autoclave drawers 29A allows the surgeon to maximize operating space and keep a sanitized working area by sanitizing surgical equipment during surgery. Once surgery is complete, the surgeon can breakdown the E-Surgical Center 29 into sections 29B to be transported.

Under EFix-Way website, (https://www.efixway.com/life-cart), it displays video illustration of the Life Cart and its function in a patient setting.

What is claimed is:

1. A one person operated medical cart designed with lightweight materials used for lifting and transporting patients in medical setting comprising:

a body:

a telescoping arm/fork system;

a counterweight within the body and movable in a widthwise direction of the body to operate as a counterweight to the telescoping arm/fork system for balancing the medical cart;

a vital sign monitoring screen;

a zero-turn radius chassis;

a clear polycarbonate microbial barrier shield;

a power assist steering system;

a standing platform for an operator;

a LED safety lighting and horn;

wherein the vital sign monitoring screen, the zero-turn radius chassis, the clear polycarbonate microbial barrier shield, the power assist steering system, the standing platform, and the LED safety lighting and horn are housed in the body, and wherein the telescoping arm/fork system comprises weight sensors, and wherein the telescoping arm/fork system is configured to fully extend and retract along an extension direction, to support a patient.

2. The medical cart of claim 1, wherein the counterweight works in conjunction with the weight sensors in the telescoping arm/fork system such that when the telescoping arm/fork system is fully extended, a notification signal is provided causing the counterweight to move in a direction parallel and opposite to the extension direction of the telescoping arm/fork system to ensure balance, wherein as the telescoping arm/fork system bring the patient closer to the body, the counterweight resumes an original centered position.

3. The medical cart of claim 1, wherein the screen is connected to monitoring devices to display a constant visual of patient critical vital signs.

4. The medical cart of claim 3 wherein the microbial clear polycarbonate barrier shield extends from the vital sign monitoring screen providing a barrier between the operator and the patient while in transit.

5. The medical cart of claim 1, wherein the zero-turn radius chassis comprises back wheels capable of directionally operating independently of each other.

6. The medical cart of claim 5, wherein the power assist steering system comprising: a steering wheel which guides the zero-turn chassis and wherein buttons on the steering wheel give the operator control and an option to change a driving direction of the back wheels independently or in unison.

7. The medical cart of claim 1 further comprising a rechargeable battery chargeable after use.

8. The medical cart of claim 1 wherein the LED safety lighting and horn work in unison to alert others that a patient is in transit.

9. The medical cart of claim 1 further comprising a bullet proof shield.

10. The medical cart of claim 1 wherein the body further comprising autoclave drawers that completely sanitize surgical equipment after use and during surgery.

* * * * *